US012811872B2

(12) United States Patent
Hellmanns

(10) Patent No.: US 12,811,872 B2
(45) Date of Patent: Nov. 24, 2026

(54) METHOD OF ROUTING IN TIME-SENSITIVE NETWORKS

(71) Applicant: HIRSCHMANN AUTOMATION AND CONTROL GMBH, Neckartenzlingen (DE)

(72) Inventor: David Hellmanns, Stuttgart (DE)

(73) Assignee: HIRSCHMANN AUTOMATION AND CONTROL GMBH, Neckartenzlingen (DE)

( * ) Notice: Subject to any disclaimer, the term of this patent is extended or adjusted under 35 U.S.C. 154(b) by 1073 days.

(21) Appl. No.: 17/422,395

(22) PCT Filed: Feb. 12, 2020

(86) PCT No.: PCT/EP2020/053588
§ 371 (c)(1),
(2) Date: Jul. 12, 2021

(87) PCT Pub. No.: WO2020/165243
PCT Pub. Date: Aug. 20, 2020

(65) Prior Publication Data

US 2022/0124020 A1 Apr. 21, 2022

(30) Foreign Application Priority Data

Feb. 12, 2019 (DE) .................... 10 2019 103 532.5

(51) Int. Cl.
*H04L 45/02* (2022.01)
*H04L 45/121* (2022.01)

(52) U.S. Cl.
CPC ........... *H04L 45/02* (2013.01); *H04L 45/121* (2013.01)

(58) Field of Classification Search
CPC ............................. H04L 45/02; H04L 45/121
(Continued)

(56) References Cited

U.S. PATENT DOCUMENTS 7,864,682 B2 * 1/2011 Appaji .................. H04L 12/66 455/445
7,965,654 B2 * 6/2011 Klincewicz ......... H04L 43/0876 370/254
(Continued)

FOREIGN PATENT DOCUMENTS

EP 2901636 B1 * 9/2016 ............ H04L 41/12

OTHER PUBLICATIONS

Nayak et al., "Incremental Flow Scheduling and Routing in Time-Sensitive Software-Defined Networks", IEEE Transactions on Industrial Informatics, vol. 14, No. 5, May 2018 (Year: 2018).*
(Continued)

*Primary Examiner* — Intekhaab A Siddiquee
(74) *Attorney, Agent, or Firm* — MH2 Technology Law Group LLP

(57) ABSTRACT

The invention relates to a method of routing in a network. The network consists of a plurality of network nodes. The network may have different interlinks and connections from one network node to the others. An actual topology for the network is thus created. According to the invention, the routing is performed in two phases. First, the number of possible links to the network nodes is reduced in a reduction phase. A reduced topology is thus created in which network nodes or links to network nodes that are not required for route finding are discarded. In a subsequent routing and time planning phase, an optimized route to a network node in the reduced topology is then calculated.

13 Claims, 8 Drawing Sheets

Figure 1:
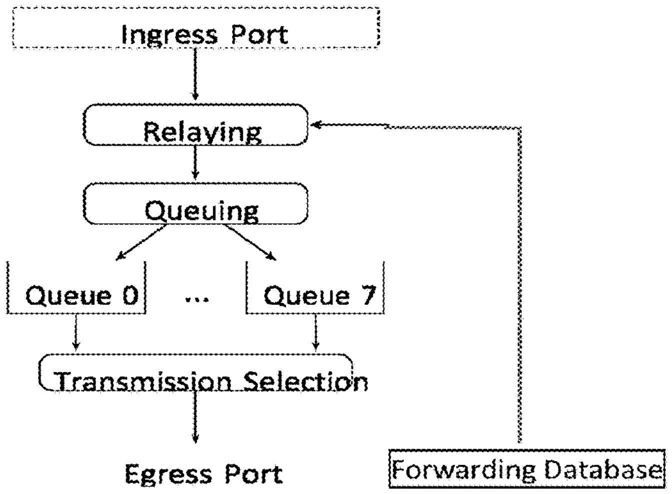

(58) Field of Classification Search
USPC .......................................................... 370/254
See application file for complete search history.

(56) References Cited

U.S. PATENT DOCUMENTS

| | | | | |
|---|---|---|---|---|
| 9,276,838 | B2 | 3/2016 | Lee | |
| 2008/0239991 | A1 * | 10/2008 | Applegate | H04L 41/5009 370/254 |

OTHER PUBLICATIONS

Karl Weber, "EtherCAT and TSN—Best Practices for Industrial Ethernet System Architectures", EtherCAT Technology Group (Year: 2018).*

* cited by examiner

METHOD OF ROUTING IN TIME-SENSITIVE NETWORKS

CROSS REFERENCE TO RELATED APPLICATIONS

This application is the US-national stage of PCT application PCT/EP2020/053588 filed 12 Feb. 2020 and claiming the priority of German patent application 102019103532.5 itself filed 12 Feb. 2019.

While real-time communication is rather rare in typical IT networks nowadays, it is a ubiquitous topic in a large number of industrial network scenarios, for example for communication between components in a vehicle or machines in production plants. These systems have high real-time requirements since malfunctions in such systems often lead to high economic damage, such as colliding robot arms in a production line, or even to the detriment of people when used for safety applications such as airbags or emergency stop switches. Industrial automation, in particular, is very susceptible to delays and delay variations within communication, as the machines and robots on an assembly line require precise control and synchronization in order to ensure an accurate manufacturing process. Proprietary solutions and dedicated networks are currently used for many of these applications in order to ensure compliance with the specified maximum delays.

Examples of such field buses are CAN, Sercos III, Profibus or EtherCat. Sercos III, Profinet and EtherCat are based on Ethernet, but they are incompatible due to proprietary extensions that make real-time guarantees possible. Accordingly, communication between devices that are connected via different field buses requires gateways. Gateways lead to communication silos that impede interoperability.

As a consequence, there is now a trend towards harmonizing the various communication standards and combining critical and non-critical traffic in one network. This trend led to the foundation of the IEEE Time-Sensitive Networking (TSN) Task Group (TG). The TSN TG proposes a family of mechanisms that are collectively referred to as TSN. These mechanisms define an IEEE 802-compliant Ethernet that can provide real-time guarantees. Ethernet is the de-facto communication standard in the IT sector. A key mechanism in TSN is IEEE standard 802.1 Qbv, which makes highly deterministic communication possible. A class-based time-slot method ("Time Division Multiple Access" (TDMA)) for Ethernet is specified therein. This standard is primarily aimed at enhancing switches but can also be implemented on end hosts.

IEEE standard 802.1 Qbv introduces a time-controlled gate in front of the queue for each traffic class at each egress port. This gate controls whether the frames in the corresponding queue are released for transmission. Each port has a time plan that defines the opening and closing times for the gates. Although the queues and thus also the gates are class-based, electricity-based control is also possible with corresponding planning. This allows each communication stream between two hosts to be planned separately.

The IEEE standard defines the control mechanism (time-controlled queues), but it does not specify algorithms for calculating these time plans that meet the real-time and bandwidth requirements of the uses. In principle, for each real-time stream, the configuration of the gates at each switch on the route between the source of the stream and the destination of the stream have to be planned accordingly. In general, the calculation of such schedules is an NP-hard problem.

This application relates to efficiently calculating time plans and routes for TSN. In order to calculate time plans, different approaches based on optimization methods such as "satisfiability modulo theory" (SMT) and integer linear programming (ILP), and heuristics for optimizing the propagation time in order to solve the problem have proven successful. Most of these approaches, however, neglect the possibility of isolating communication streams not only temporally by means of time planning, but also spatially by means of routing. Basic time and route planning approaches are known from the prior art. However, if these two problems are considered together, the search space for solutions to the already very complex planning problem is increased even further.

The calculation of time-controlled (TDMA) time plans with predetermined routes was considered in multiple approaches, in particular for field buses, which today are predominantly based on real-time Ethernet technologies. In the publication "An Evaluation of SMT-Based Schedule Synthesis for Time-Triggered Multi-hop Networks" (Wilfried Steiner; 2010), Steiner et al. propose modelling the scheduling problem in TTEthernet as a "constraint satisfaction" problem by means of the "satisfiability modulo theory" (SMT), which can be solved using standard SMT solvers.

In order to ensure that transmitter applications deliver the messages to be sent to the network in good time, formulations of the common process and network planning problem have been proposed in "SMT-based Task- and Network-Level Static Schedule Generation for Time-Triggered Network Systems" (Craciunas/Oliver, 2016) and "Combined Task- and Network-Level Scheduling for Distributed Time-Triggered Systems" (Craciunas/Oliver, 2014), also based on SMT.

Integer linear programming (ILP) is another known method of formulating planning problems taking optimization goals into account. In "Profinet IO IRT Message Scheduling" (Hanzalek/Burget/Sucha, 2009), ILP formulations for optimized planning problems are proposed that minimized the calculation time for creating a time plan for Profibus IRT or TSN.

However, SMT and ILP approaches that aim to provide an exact solution for planning problems suffer from the high complexity of the underlying NP-hard optimization problems. Therefore, multiple heuristics have been proposed for accelerating the time plan calculation. Heuristics based on the tabu search that reduce the runtime of the optimal TSN planning problem was proposed for this purpose.

All of the above-described approaches concentrate exclusively on the temporal isolation of real-time streams without considering the possibility of isolating streams spatially by routing them along different paths. The planning tool can thus only find solutions along the edges of predetermined routes, which limits the solution space.

Spatial and temporal isolation of streams is taken into account by common routing and time-planning approaches. An approach is known for enhancing software-defined networking (SDN) in order to achieve real-time capability with regard to limited message propagation time and propagation time distribution. For this purpose, three systems are known for the temporal separation and spatial separation of real-time streams by routing and planning. Two of the three proposed systems are heuristic and limit the search space by excluding solutions. The third approach uses an ILP model to calculate routes and time plans in one step. The routing part of the presented ILP model is similar to the basic model. Instead of optimizing the ILP model, however, heuristics are proposed that reduce the number of route options and thereby disregard valid solutions. In the present application, a limitation of the solution space is deliberately dispensed with.

Furthermore, the described approach can be expanded to make the iterative addition of stream allocations possible. In this expansion, edges that connect uninvolved end hosts to the network are removed. This is a very simple approach for reducing the model size, but most parts of the topology that contain invalid solutions remain unaffected. In contrast to this approach, this application now excludes all edges and nodes that are not part of a loop-free route for a particular stream. To do this, a dedicated reduced topology is calculated for each source-destination node combination, drastically reduced by the problem size.

Furthermore, an approach for joint route and time planning in the form of a 0-1 ILP for mixed critical automotive networks is known. A model is described that is specially tailored to a use scenario. As a result, the proposed approach in the ILP formulation has certain limitations, e.g. the time-plan granularity is directly linked to the number of variables. In contrast, a generic model is considered in this application. Furthermore, the present optimization can be used to optimize the above-described approach.

ILP models for common routing and scheduling for TSN networks are also known from the prior art. Both approaches present elaborate planning models, which are not the focus of this application, but both did not take into account optimizations of the topology in order to reduce the complexity of the ILP. However, since their routing models are very similar to the basic routing model used in this application, the optimization pursued in this application can easily be adapted to the proposed ILPs. It is shown below that the optimized model also exhibits better performance in comparison with the simpler planning model used.

Finally, analytical approaches are discussed that check the compliance of a certain time plan under certain conditions such as deadlines or limited buffer sizes (maximum backlog size for switches). In particular, a plurality of expansions of the formal network calculus framework are proposed in the prior art, for example from "Modelling in network calculus a TSN architecture mixing Time-Triggered, Credit Based Shaper and Best-Effort queues" (Daigmorte, Boyer, Zhao; 2018), for modelling time-controlled planning mechanisms, such as the timed gating mechanism, from TSN as well as modelling other planning algorithms such as the credit-based shaper (CBS) from TSN, which is mainly used for audio/video traffic. These analytical approaches are particularly useful for analyzing convergent networks, in which the simultaneous execution of different planning mechanisms leads to non-trivial effects. For example, the influence of high-priority time-controlled traffic on low-priority traffic could be analyzed. However, this analysis requires a predetermined time plan as input and therefore does not replace the algorithms for time plan and route synthesis for time-controlled traffic, as intended in this application.

The object of this invention is to provide an optimized approach for the common time and route planning problem. This object is achieved by the features of claim 1.

Instead of solving the entire common time and route planning problem, a pre-processing step is proposed that excludes impossible solutions before the reduced problem is solved using ILP. The pre-processing step significantly reduces the number of conditions and variables of the ILP without excluding possible solutions, i.e., without compromising the quality of the solution.

In summary, it can be said that the following effects are achieved: introducing a pre-processing step to significantly reduce the ILP model size without excluding valid solutions, and evaluating the proposed approach with respect to scalability with regard to the runtime.

Switched Ethernet networks typically operate in full duplex mode. As a result, a full duplex operation is assumed, but the transfer of the system model and the proposed optimization to half duplex operation requires only minor adjustments. The network according to the invention is modelled as a directed graph G={V, E} and V and E denote the nodes and edges of the topology. The edges (E) represent the Ethernet connections and each edge e is defined by the tuple of the connected nodes, $e=(V_0, V_1)$ EV×V/$V_0 \neq V_1$. The use of a directed graph allows modelling of full duplex connections, i.e., independent communication in both directions. In addition, hosts are defined as nodes having only one full duplex connection (∀ V E Hosts: indegree(V)=outdegree(V)=1) and all other nodes are defined as switches (∀ v E Switches: indegree(V)=outdegree(V)>1), this results in V=Hosts U Switches.

Time-critical control applications, at which IEEE Std 802.1Qbv is aimed, typically run cyclically and model a control loop between the sensor, actuator and controller. Unidirectional data streams (source hosts to destination hosts) are modelled. The bidirectional communication is therefore modelled as two streams. A stream s is defined as a tuple of the source, the destination, the size (number of bytes), the maximum tolerated delay and the cycle time: $s=V_{src}$, $V_{dst}$, size, d, C)/$V_s$, $V_d$ E Hosts, d E $\mathbb{N}$,size E[64, MTU]. The amount of all the streams is defined by S.

The switches in the present model conform to IEEE Std 802.1Q and in particular implement the "Enhancements for scheduled traffic". In G, ingress ports are modelled as incoming edges and egress ports are modelled as outgoing edges. Although a true switch implements the two functionalities in one physical port, the internal processing of incoming frames and outgoing frames is strictly separated. Therefore, the present model does not contravene the general validity.

In order to further structure the following description of the switch model, it is now described how a frame is handled from its arrival at the ingress port, via the processing and queue, to the onward transmission thereof at the egress port. For the sake of simplicity, the forwarding process is divided into four phases, specifically routing, queue, transfer selection and transfer.

After the frame arrives at the ingress port, the switch evaluates the frame's Ethernet header. The switch selects the destination egress port based on the receiver address and the content of the forwarding database, which contains an assignment of destination MAC addresses to egress ports. The switch provides one or more queues at the egress port, since the incoming data rate can be higher than the outgoing data rate of the egress port, as frames from a plurality of ingress ports can be sent via one egress port. The "Enhancements for scheduled traffic" allow the implementation of up to eight queues in order to handle different types of data traffic separately. The switch assigns a frame to one of the queues by evaluating the "priority code point" (PCP) in the VLAN tag of the frame and carrying out a configurable assignment of PCP values to the hardware queues. In the present model, a distinction is made between high-priority control frames and best effort frames. Accordingly, a switch is modelled with two logical queues.

In the case of switches having more than two hardware queues, one of them is assigned a logical queue and the others are merged into the second logical queue. This application does not consider the influence of further prioritization or traffic shaping in the second queue. It should be noted that, Qbv does not make sense in a single queue scenario with converged data traffic.

The logic of the transmission selection (TS) decides which queue will be processed in the next step. This decision is based on the "transmission selection algorithm" (TSA), which is implemented for each queue. The TS polls the TSA of each queue in descending order to determine if a frame is available for transmission.

Although IEEE Std 802.1Q specifies a plurality of TSAs, according to the invention, the strict priority is modelled and other TSAs are considered to be out of scope. The TSA with high priority advertises an available frame for transmission if the queue is not empty. As a result, the TS selects the frame at the front of the non-empty queue with the highest priority. However, this mechanism alone is not able to give hard real-time guarantees with regard to limited latency times or jitter. In the worst case, a frame with high priority is delayed by the transmission time of an MTU-sized best-effort frame that is currently in transmission.

Therefore, IEEE Std 802.1Q specifies an additional mechanism called "gating", which allows the processing of queues to be switched on or off for a certain period of time. This mechanism is implemented by placing a gate after each queue. When the gate of a queue is closed, the TS ignores the queue. This means that the egress port can be used by one queue or a plurality of queues on a dedicated basis. Gating thus makes the temporal separation of high-priority traffic and best effort traffic possible. The opening and closing times of the gates are configured in the gate control list (GCL). The GCL is therefore the implementation of a time plan in which the queue obtains access to the medium. In order to meet the latency requirements of a stream, the GCLs of all switches passed through have to be calculated accordingly. The calculation of all GCLs in a network is therefore a global planning problem.

The GCL is a list of tuples that describe the gate states as a binary vector and the duration of the state. Switches execute GCLs cyclically, i.e., after the last state, the switch starts processing the GCL from the beginning. The duration of a GCL cycle is defined in the cycle time. If the sum of the durations of all GCL entries is less than the cycle time, the last state is held in order to close the gap. In order to ensure the synchronous execution of all GCLs (one for each egress port) on a switch, the switch maintains a global clock. The switches of a TSN domain synchronize their clocks using the "precision time protocol" (PTP). The processing in the switch described above results in delays in a frame. These delays are formalized as the processing delay dpr, that relates to the switching process, and the waiting time dq, which expresses the time the frame spends in the queue of this switch. It is assumed that the processing delay is specific to each switch but does not change, and that the queuing delay is zero because the present approach is designed to prevent high priority control frames from waiting.

In addition to the mentioned delays in the switch, a frame experiences further delays on its way from the source host to the destination host, specifically transmission delay and propagation time delay. The transmission delay dtr is the time to modulate the bits of the frame on the cable depending on the connection speed and the frame size. The connection speed is modelled as a link property and, on basis thereof, the present model is able to take into account different connection speeds in a network. The transmission delay is calculated as follows: dtr=(link speed)/(frame size). The signal propagation time characterizes the time that the signal requires to propagate in the transmission medium. The signal propagation time therefore depends on a material constant, which describes the signal propagation speed, and is also dependent on the cable length. Typical materials are copper (coaxial cable) and air (glass fiber).

In the present case, the propagation speed and cable length are described as link properties and therefore support different cable lengths and transmission media in the present model. The signal propagation time is calculated as follows: dpg=propagation_speed·cable_length. Since the signal propagation speed is link-specific, it can be calculated in a pre-processing step and a constant link-specific value can be used in the present model. The delay definitions mentioned are used to calculate how long a frame occupies a connection and to calculate the arrival time of the frames at the next node.

In order to express the delays discussed in our model, three binary auxiliary relations and one auxiliary function are introduced (see equation 1):

$$\forall \mathcal{V} \in \mathcal{V}\text{: processing\_delay}_v \in \text{processing\_delay}(\mathcal{V}) \quad (1)$$

$$\forall e \in \mathcal{E}\text{: link\_speed}_e \in \text{link\_speed}(e)$$

$$\forall e \in \mathcal{E}\text{: propagation\_delay}_e \in \text{propagation\_delay}(e)$$

$$\text{transmission\_delay(stream\_size, link\_speed)} \rightarrow \frac{\text{stream\_size}}{\text{link\_speed}}$$

The calculation of Gate Control Lists (GCLs) for stream-based planning requires a route for each stream and a time plan for the edges of this route. Most approaches to calculating real-time communication time planes use a routing algorithm as a pre-processing step in order to determine the routes for all streams. In these approaches, the actual planning problem is usually modelled as an ILP, SMT or another optimization problem. Although the solver of the optimization problem searches the search space completely, it is possible for existing solutions to not be found because the spatial dimension of the problem is not considered. In addition, the solution of the pure time planning problem is already NP-hard and accordingly time-consuming. If the given time planning problem proves unsolvable, the processing time is wasted. Finding the cause of the failure to find a solution is a challenge, because the cause can be manifold. For example, it is not possible to differentiate between the case that the network capacity is insufficient to cover the required stream demand and the fact that the "wrong" routes were selected in the pre-processing step. Due to the large number of route combinations available and the complexity of the time planning problem, a complete search over all combinations of routes is not possible.

The problem of the excluded solutions could be addressed by expanding the optimization problem to solve the routing problem and the time planning problem together. Previously, approaches have been presented for implementing and evaluating such optimization problems, which demonstrate the high level of complexity. Based on these results, the question arises as to how the joint calculation of routes and schedules can be optimized. The implementation of heuristics leads back to the initial problem of the excluded solutions. Therefore, only optimizations without prior elimination of possible solutions are acceptable. For this reason, an approach is proposed that is based on the idea of calculating dedicated topologies for each source-destination combination. These user-defined topologies are subgraphs of the actual network topology, reduced by edges and nodes that are not part of a valid route between source and destination. Since only edges and nodes of unrealizable routes are excluded, no solutions are eliminated and only the search space is reduced.

In this section, the formulation of the common routing and time planning problem is presented on the basis of the previously presented system model (see section 3). For reasons of readability, the description of the problem of joint route planning and time planning has been divided into two sub-problems, specifically route planning and time planning. Although the calculation of time planning and routes is highly dependent on each other, since a time plan always belongs to a route due to the temporal assignment to the edges of the routes, the ILP conditions for the two sub-problems are described separately.

This begins with the representation of the routing conditions.

As already presented, a directed graph is used to represent the network topology for routing purposes. Two auxiliary relations are then defined, specifically in_edges and out_edges. These two relationships contain the incoming edges or outgoing edges for each node.

$$\forall \mathcal{V} \in \mathcal{V}, \forall (\mathcal{V}', v) \in \mathcal{E} : (\mathcal{V}, \mathcal{V}') \in \text{in\_edges}(\mathcal{V}) \quad (2)$$

$$\forall \mathcal{V} \in \mathcal{V}, \forall (\mathcal{V}', \mathcal{V}) \in \mathcal{E} : (\mathcal{V}, \mathcal{V}') \in \text{out\_edges}(\mathcal{V})$$

A binary decision variable $x_{s,e}$ {0,1} is introduced for the routing that, for each stream-edge combination in (s,e) indicates whether the stream s uses the edge e. If $x_{s,e}=1$, the edge e is said to be active for stream s. Otherwise the edge is said to be inactive.

In order to calculate the routes, five basic conditions are used for each stream: First, the source node ( ) only sends information (unidirectional communication), therefore it may not have any active incoming edges. Since $x_{s,e}$ cannot be negative, the restriction does not result in an active incoming edge $$\forall (\mathcal{V}_{src}, \mathcal{V}_{dst}, \text{size}, d, c) \in \mathcal{S}: \sum_{e \in in\_edges(\mathcal{V}_{src})} x_{s,e} = 0 \quad (3)$$

Second, the source node has to have exactly one active outgoing edge since it is the beginning of the route:

$$\forall (\mathcal{V}_{src}, \mathcal{V}_{dst}, \text{size}, d, c) \in \mathcal{S}: \sum_{e \in out\_edges(\mathcal{V}_{src})} x_{s,e} = 1 \quad (4)$$

Due to $x_{s,e}$ {0,1}, the restriction can only be satisfied if the following condition is met:

$$x_{s,e'} = 1 \wedge \forall \text{ Eout\_edges}(V_{src}) \backslash \{d'\} : x_{s,e} = 0.$$

Third, the destination node may not have any active outgoing edges since it is the end of the route:

$$\forall (\mathcal{V}_{src}, \mathcal{V}_{dst}, \text{size}, d, c) \in \mathcal{S}: \sum_{e \in in\_edges(\mathcal{V}_{src})} x_{s,e} = 0 \quad (5)$$

Fourth, since the route must end on exactly one path at the destination node, the number of active incoming edges is limited to 1:

$$\forall (\mathcal{V}_{src}, \mathcal{V}_{dst}, \text{size}, d, c) \in \mathcal{S}: \sum_{e \in out\_edges(\mathcal{V}_{src})} x_{s,e} = 1 \quad (6)$$

Finally, after the conditions for the source and destination nodes have been described, it has to be ensured that the route through the network is contiguous. Therefore, it is defined that for all nodes of each stream that are neither source nodes nor destination nodes, the number of active incoming edges has to be equal to the number of active outgoing edges:

$$\forall (\mathcal{V}_{src}, \mathcal{V}_{dst}, \text{size}, d, c) \in \mathcal{S}, \quad (7)$$

$$\forall \mathcal{V} \in \mathcal{V} \backslash \{\mathcal{V}_{src}, \mathcal{V}_{dst}\}: \sum_{e \in in\_edges(\mathcal{V})} x_{s,e} = \sum_{e \in out\_edges(\mathcal{V})} x_{s,e}$$

The routing conditions presented provide the information as to whether the edge for each stream-edge combination is active. The time planning conditions have to ensure that a plurality of streams is not planned such that they use the same edge at the same time. Basically, the time planning conditions enforce the TDMA of streams on the edges of the network. For this purpose, for each stream, two integer variables are presented for each edge, which denote the beginning and the end of the assignment of the relevant stream on the relevant edge: $\text{Start}_{s,e}$,$\text{end}_{s,e}$[0, s.d].

In the present model, the following conditions have to be ensured: First, only edges that do not violate the routing conditions may be used. Second, the length of the allocation has to be sufficient to transmit the stream. The described delay definitions are used to calculate the required allocation. Third, the allocation has to be consecutive on consecutive edges, i.e., transmission to the next edge has to begin immediately after the switch has finished processing the frame. Fourth, a plurality of streams may not use an edge at the same time (TDMA). The necessary conditions are presented below.

First, there is a limitation with respect to the fact that a stream can only allocate time to edges that do not violate the routing conditions. Equation 8 ensures that $\text{end}_{s,e}=0$ if $x_{s,e}=0$, otherwise $\text{end}_{s,e}$ is only limited by the cycle time.

$$\forall e \in \mathcal{E}, \forall s \in \mathfrak{S} : \text{end}_{s,e} \leq \text{cycle\_time} \cdot x_{s,e}t\} : \quad (8)$$

In addition, an allocation on one edge has to be sufficient to transmit the entire content of the stream. Therefore, the condition for the allocation duration takes into account the propagation time delay and the transmission delay.

$$\forall e \in \mathcal{E}, \forall s \in \mathfrak{S} : \text{end}_{s,e} = \quad (9)$$

$$\text{start}_{s,e+} x_{s,e} \cdot \text{transmission\_delay(stream\_size, link\_speed}(e))$$

If the edge is not active, equation 9 sets $\text{Start}_{s,e}=\text{end}_{s,e}=0$, otherwise the length of the allocation is set to the duration of the transmission. In addition, it has to be ensured that consecutive allocations take place on consecutive streams. The processing delay of the passed node is thus taken into account.

$$\forall\, (\mathcal{V}_{src}, \mathcal{V}_{dst}, \text{size}, d, c) \in \mathcal{S},\ \forall\, \mathcal{V} \in \mathcal{V}\backslash\{\mathcal{V}_{src}, \mathcal{V}_{dst}\}: \sum_{e \in in\_edges\,(e)} \text{end}_{s,e} + x_{s,e} \cdot \left(\text{propagation}_{delay(e)} + \text{processing}_{delay(\mathcal{V})}\right) = \sum_{e \in out\_edges\,(\mathcal{V})} \text{start}_{s,e} \tag{10}$$

Finally, a condition is defined to prevent a plurality of simultaneous allocations on the same edge by ensuring that the allocations do not overlap. In order to express that exactly one of the described assignments has to be selected, an xor has to be implemented.

ILPs generally do not support Boolean operators because they are difficult to express as a linear condition. However, depending on the solver used, what are referred to as indicator conditions can be used for modelling xor. If the solver does not support indicator conditions, Big M constraints are able to express the xor operation.

For the sake of simplicity, Big M constraints are referred to here and a new binary variable $y=_{s,s',e}$ is introduced for each pair of potentially colliding streams (s, s'). A constant M is also required that is always greater than the left-hand side of the equation. However, if the constant chosen is too large it can lead to numerical problems that invalidate the solution. M:=max(s.d,s'.d) is therefore set in our model since the maximum of the deadlines of the two streams has to be greater than the end of the allocations on all edges of these streams.

In order to prevent two streams from overlapping, two conditions are implemented that force stream s to be allocated before stream s' or force stream s' to be assigned before stream s:

$$\forall\, ((s, s'), e) \in (\mathfrak{S} \times \mathfrak{S}) \times \mathcal{E} / s \neq s': \quad \text{end}_{s,e} \leq \text{start}_{s',e} + y_{s,s',e} \cdot M, \tag{11}$$

$y_{s,s',e}\cdot M$ is added on the right-hand side of the first condition, $(1-y_{s,s',e})\cdot M$ is added on the right-hand side of the second condition. Since, $y=_{s,s',e}$ is binary, the solver can either assign $y_{s,s',e}:=0$, that causes stream s to be allocated before stream s', or $y_{s,s',e}:=1$ has to be fulfilled, which causes stream s' to be allocated before stream s.

The basic ILP formulation of the routing and time planning problem presented in this section can already be solved by means of a standard ILP solver. In general, however, it suffers from scalability problems due to the plurality of conditions and variables. Even in network topologies having many alternative routes, the joint solution to the time planning and routing problem significantly increases the search space. Therefore, a method is now proposed for reducing the search space without impairing the quality of the result.

The size of the ILP base model grows significantly with each additional stream since each stream can potentially use each edge. Therefore, the number of decision variables and conditions increases with each additional stream. Many of these additional conditions and variables restrict edges which are not part of technically feasible routes. Therefore, the routing and scheduling ILP model can be reduced without excluding workable solutions. In particular, according to the invention, only collisions of streams at edges that are part of valid routes are taken into account. In the basic model, the effort for preventing overlapping allocations scales quadratically with the number of the streams.

The basic concept of this approach is to first reduce the number of edges of the original topology in a pre-processing step (topology reduction phase). For this purpose, a dedicated reduced topology is calculated for each source-destination node combination. In the reduction phase, it is crucial to not limit the solution space, but only remove edges that are not part of a workable solution for the relevant source-destination node combination. It should be noted that this is the main difference from related approaches that also use a pre-processing step to restrict paths before solving the routing and scheduling problem.

These approaches typically use heuristics to select a number of promising routes, such as the k shortest paths, without ensuring that workable solutions are not excluded. Instead, the present invention seeks to precisely exclude the edges that are not part of a workable solution. Our optimization proposal consists of two parts, specifically the topology reduction and the actual routing and time planning phase. The topology reduction is carried out as a pre-processing step. In order to map the results of the pre-processing step in the ILP, the ILP model is adapted accordingly.

First, the calculation of the reduced topologies is explained. In this phase, a separate topology is introduced for each combination of source and destination. As a result, the ILP does not receive an entire topology as input but takes into account an adapted topology for each source-destination combination. All loop-free routes from the source to the destination are calculated for each source-destination combination.

After the routes have been calculated, a separate topology is calculated for each source-destination combination by discarding all edges in the topology that are not part of a route for this specific source-destination combination. The topology reduction method is presented as pseudocode in listing 1.

Since all routes are calculated, the solvability is not restricted. In general, routes can exist between any two nodes up to //!. However, it can be assumed that real topologies have a much smaller number of paths because the connectivity is much lower than in the case of complete graphs.

```
foreach src-dst in source-destination
combinations: paths :=calculate all paths from
src to dst
edges :=set( )
vertices :=set( )
foreach path in paths:
    foreach edge in path.edges:
    edges.add(edge)
foreach vertice in path.vertices:
    vertices.add(vertice)
foreach stream in streams[src-dest]:
    stream_edges.add(stream, edges)
    stream_vertices.add(stream, vertices)
    (Listing 1)
```

In order to take the precalculated routes into account, the conditions of the model according to the invention are adapted as follows: two auxiliary relations are presented, specifically stream_edges and stream_vertices, which contain the edges and nodes of the precalculated routes that represent the reduced topology for each stream (see equation 12).

$$\forall s \in \mathcal{S}: \{(s, \text{edges}) \in \text{stream\_edges}(s) / \text{edges} \subset \mathcal{E}\} \tag{12}$$

$$\forall s \in \mathcal{S}: \{(s, \text{edges}) \in \text{stream\_vertices}(s) / \text{vertices} \subset \mathcal{V}\}$$

Instead of /$x_{s,e}$/=/x/, | the number of decision variables is reduced to /$x_{s,e}$/=/x stream_edges( )/. In addition, due to the fact that :in_edges(src) stream_edges(s)=ø and :out_edges (dst) stream_edges(s)=ø, it is possible to omit the restrictions that set the number of active input edges for the source to zero (equation 3) and set the number of active output edges of the destination to zero (equation 5). In equation 4, equation 6, and equation 7, only the permissible edges of the corresponding stream in equation 13, equation 14, and equation 15 have to be taken into account.

$$\forall (\mathcal{V}_{src}, \mathcal{V}_{dst}, \text{size}, d, c) \in \mathcal{S}: \sum_{e \in out\_edges(\mathcal{V}_{src}) \cap stream\_edges(s)} x_{s,e} = 1 \tag{13}$$

$$\forall (\mathcal{V}_{src}, \mathcal{V}_{dst}, \text{size}, d, c) \in \mathcal{S}: \sum_{e \in in\_edges(\mathcal{V}_{dst}) \cap stream\_edges(s)} x_{s,e} = 1 \tag{14}$$

$$\forall (\mathcal{V}_{src}, \mathcal{V}_{dst}, \text{size}, d, c) \in \mathcal{S}, \forall \mathcal{V} \in \text{stream\_vertices}(s) \backslash \{\mathcal{V}_{src}, \mathcal{V}_{dst}\}: \sum_{e \in in\_edges(\mathcal{V}) \cap stream\_edges(s)} x_{s,e} = \sum_{e \in out\_edges(\mathcal{V}) \cap stream\_edges(s)} x_{s,e} \tag{15}$$

If there is only one route for a certain source-destination combination, the routing equations can be omitted and all $x_{s,e}$ can be set, i.e., set to 1 for this source-destination combination in the planning restrictions, i.e., no further routing needs to be performed by the ILP if the selection of the route is trivial. Finally, the route options are reduced to the route options that are actually available. Therefore, the model size generally shrinks.

For time planning purposes, all occurrences of are replaced with stream_edges(s), with stream_vertices(s), out_ edges( ) with out_edges( ) stream_edges(s), and in_edges( ) with out_edges( ) stream_edges(s). The resulting restrictions of the reduced problem are listed in the following:

$$\forall s(\mathcal{V}_{src}, \mathcal{V}_{dst}, \text{size}, d, c) \in \mathcal{S}, \tag{16}$$

$$\forall e \in \text{stream\_edges}(s): \text{end}_{s,e} \leq d \cdot x_{s,e} \tag{17}$$

$$\forall s \in \mathcal{S}, \forall e \in \text{stream\_edges}(s): \text{end}_{s,e} = \text{start}_{s,e} + x_{s,e} \cdot (\text{propagation\_delay}(e) + \text{transmission\_delay}(\text{stream\_size}, \text{link\_speed}(e))$$

$$\forall (\mathcal{V}_{src}, \mathcal{V}_{dst}, \text{size}, d, c) \in \mathcal{S}, \forall \mathcal{V} \in \mathcal{V} \backslash \{\mathcal{V}_{src}, \mathcal{V}_{dst}\}: \sum_{e \in in\_edges(e) \cap stream\_edges(s)} \text{end}_{s,e} + x_{s,e} \cdot \text{processing\_delay}(\mathcal{V}) = \sum_{e \in out\ edges(\mathcal{V}) \cap stream\_edges(s)} \text{start}_{s,e} \text{end}_{s\prime,e} \leq \text{start}_{s,e} + (1 - y_{s,s',e}) \cdot M, \tag{18}$$

Since /stream_edges(s)/<</E/ and /stream_vertices(s)/<</V/ applies in most cases, the total number of restrictions is significantly reduced.

In summary, it can be said that the necessary adjustments to the ILP formulation are limited to quantifiers and sum limits. Therefore, the effort for adjusting the associated common routing and time planning approaches is estimated to be low.

The presented optimization on the basis of reduced network topologies for each source-destination combination deliberately does not exclude any workable solutions. Nevertheless, reduced topologies can be given not only on a source-destination basis, but also on a stream basis, which leads to separate reduced topologies for each stream. The network planner can decide on a stream basis how many routing options are to be modelled. Therefore, the complexity of the model can be adjusted during the design phase.

In addition, further pre-processing steps can be implemented. For example, the occupancy rate of different edges or the collision probability of streams can be evaluated. The reduced topologies can be optimized based on the results of these additional steps, which leads to optimized models having reduced search spaces.

Figure 2:
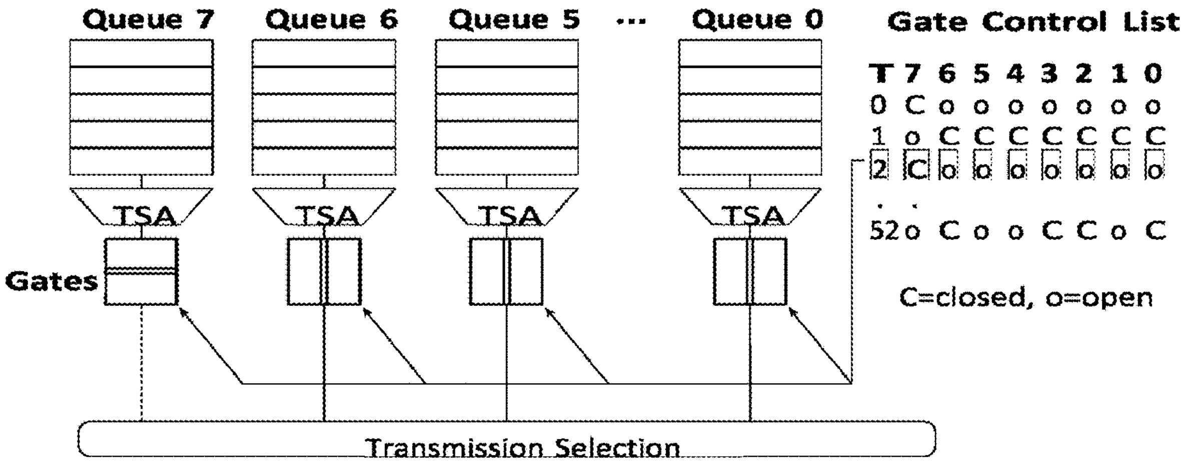
Figure 3:
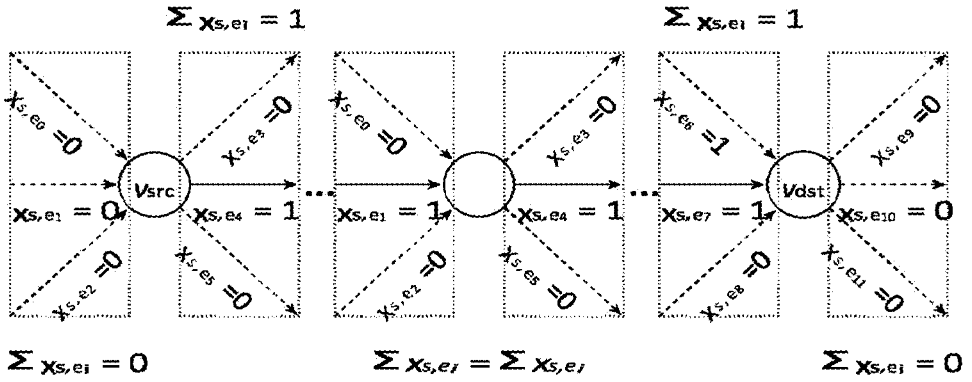
Figure 4:
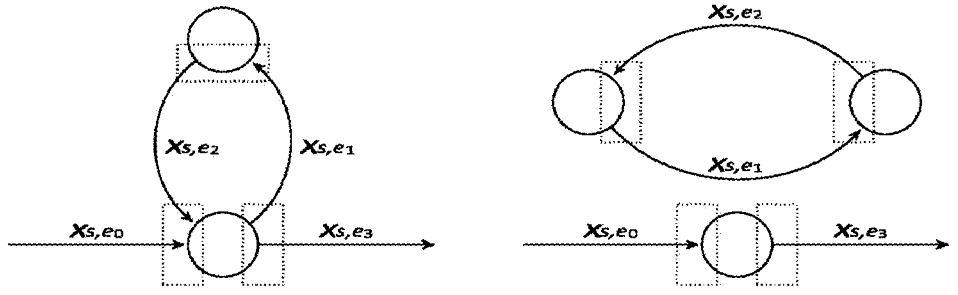
Figure 5:
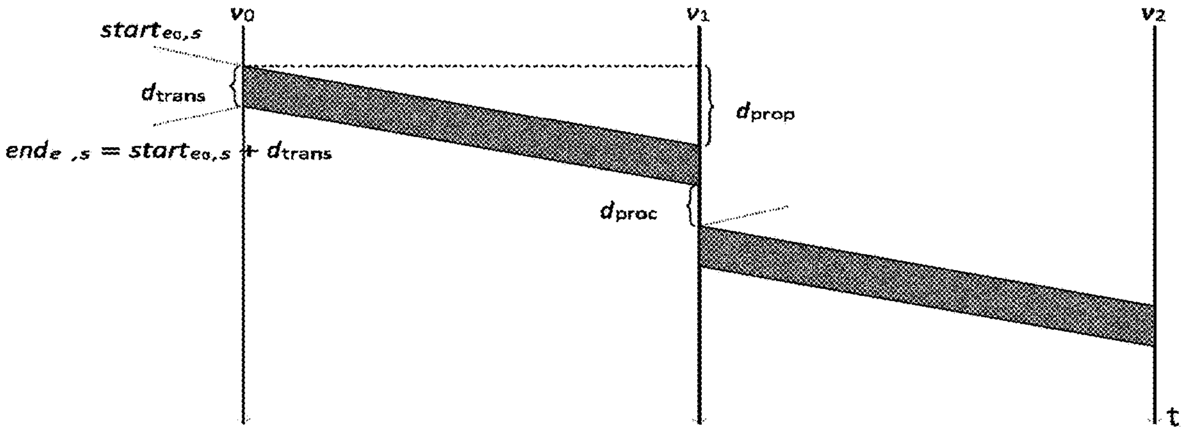
Figure 6:
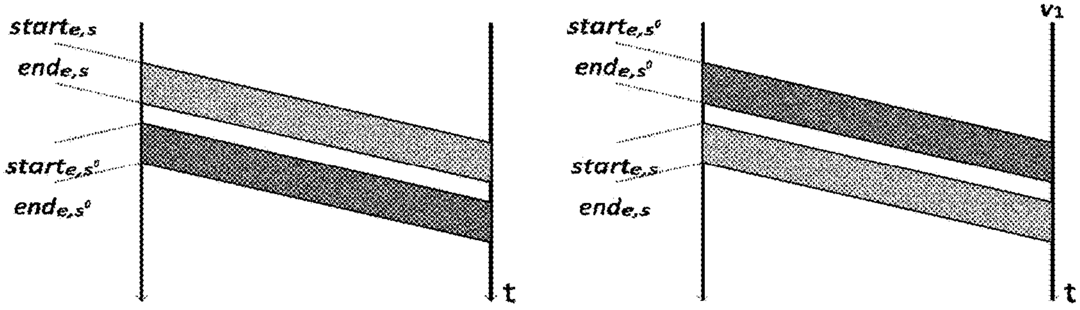
Figure 7:
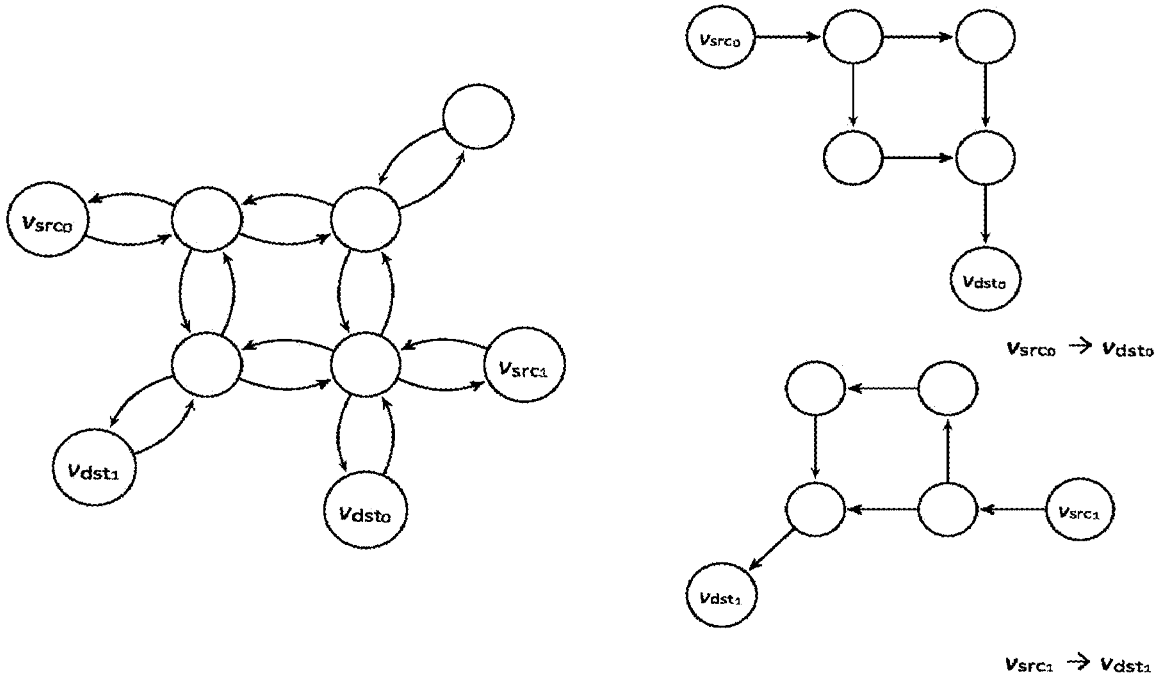
Figure 8:
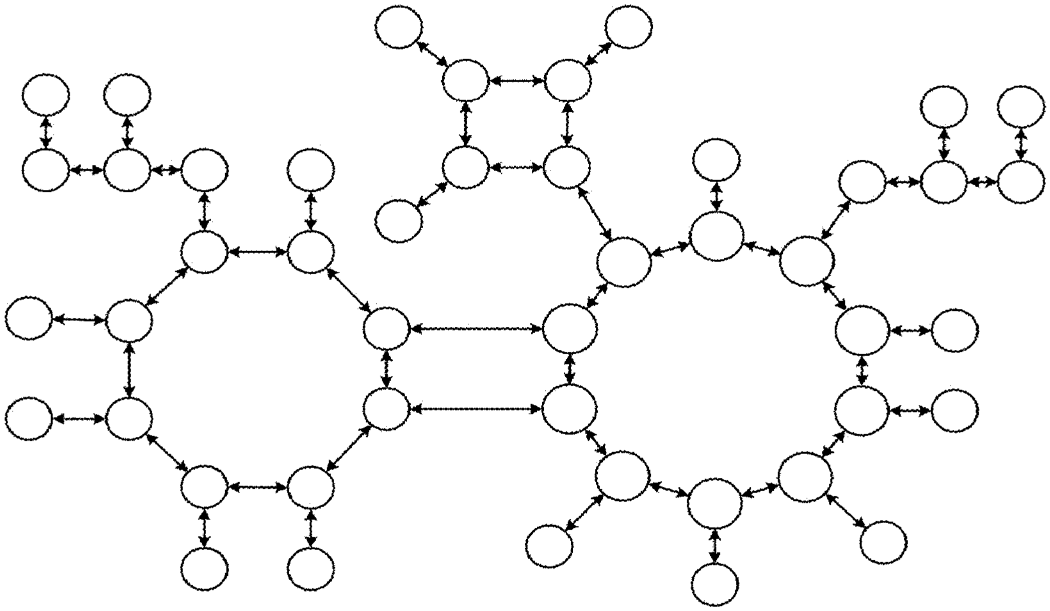
Figure 9:
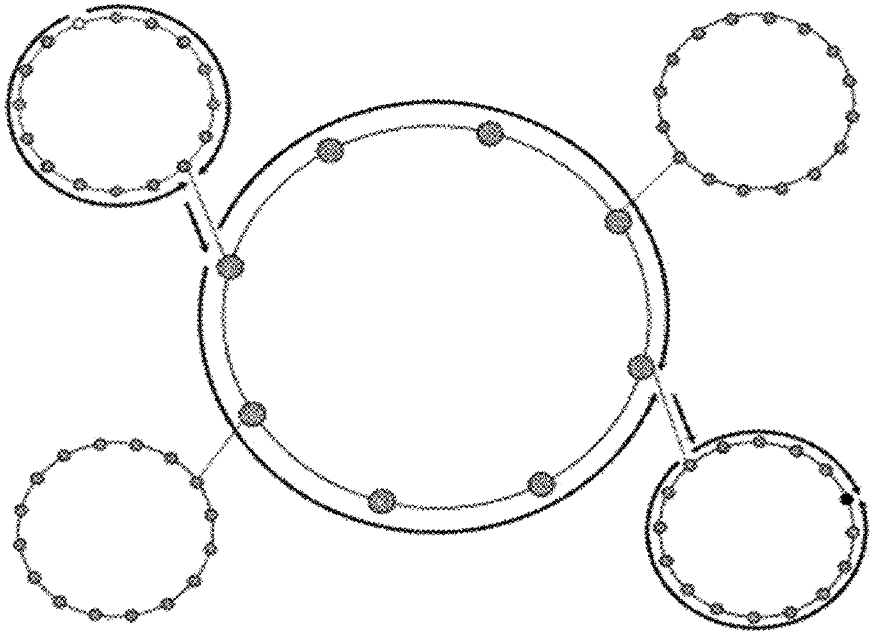
Figure 10:
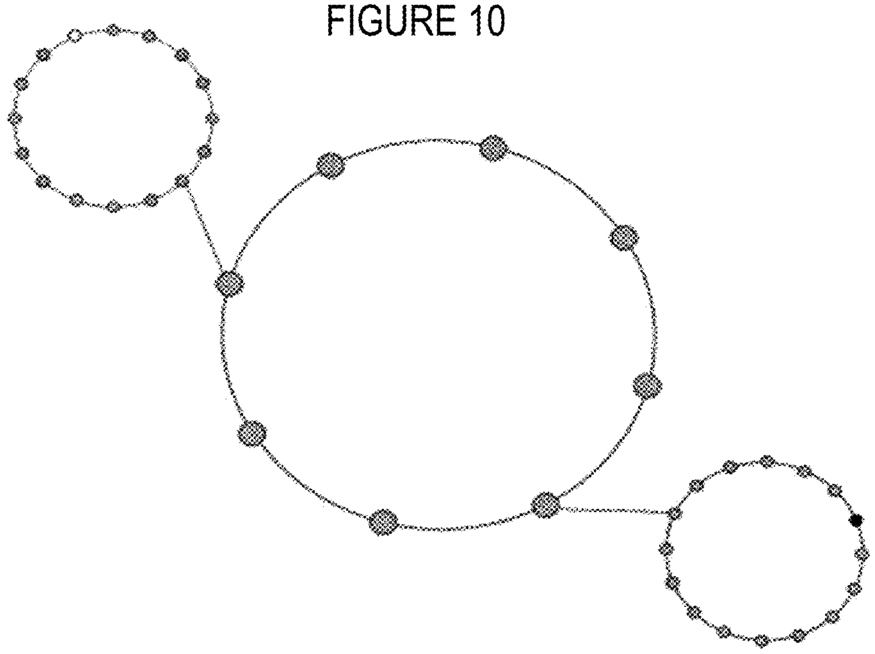
Figure 11:
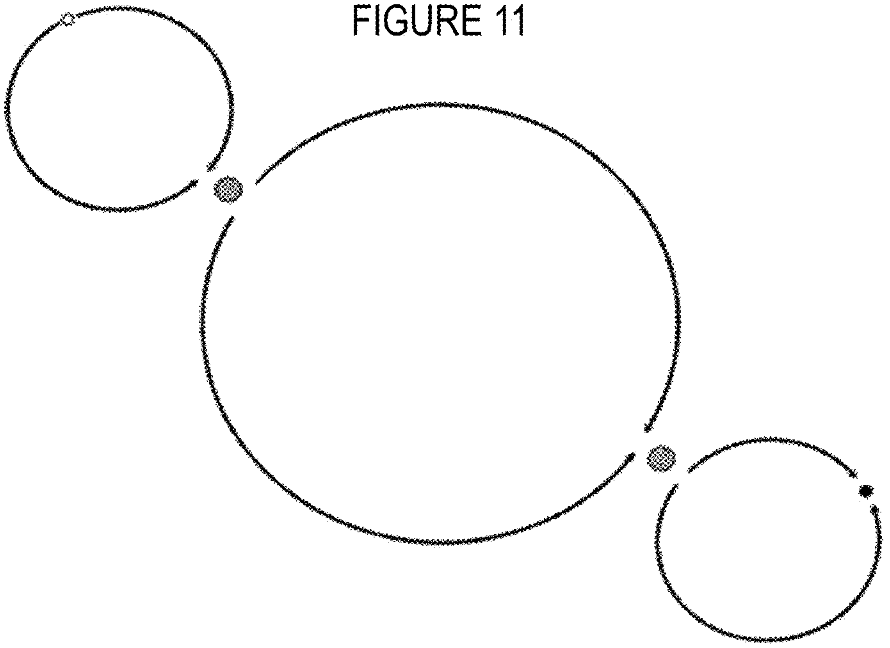
Figure 12:
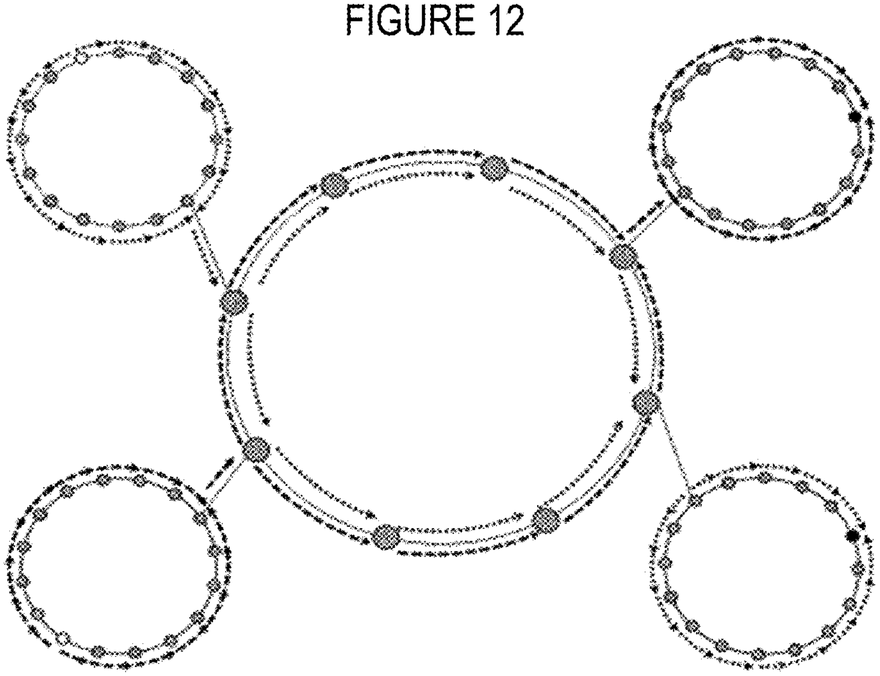
Figure 13:
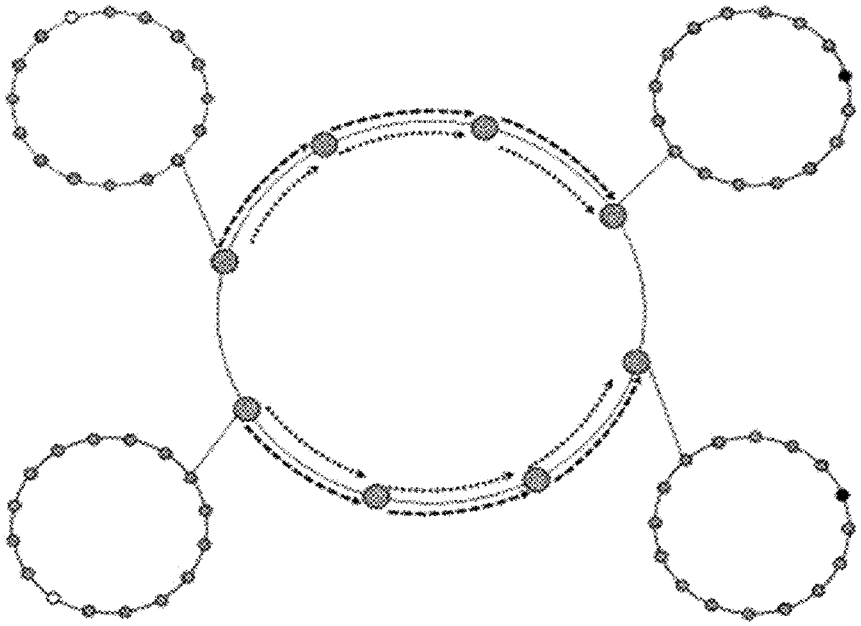
Figure 14:
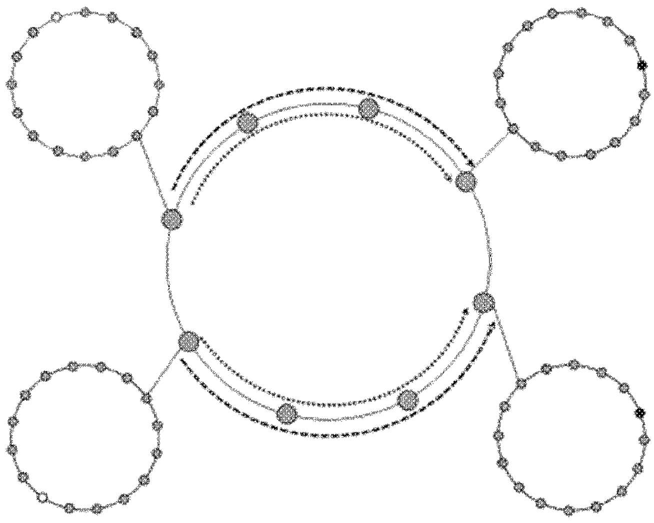

Further features of the present invention can be found in the accompanying drawings, which show:

FIG. 1: The packet forwarding functions of an IEEE Std 802.1Q-compliant switch;

FIG. 2: Transmission selection, as specified in IEEE 802.1Q;

FIG. 3: Route finding conditions for stream s;

FIG. 4: The conditions for the route finding do not exclude two specific cases when they are used on their own;

FIG. 5: The relationship between the start and end of an allocation on consecutive edges;

FIG. 6: Equation 11 prevents collisions by allocating either stream s before stream s' or stream s before stream s';

FIG. 7: An example of a graph reduction;

FIG. 8: An exemplary topology for a factory network;

FIG. 9: Exemplary routing options;

FIG. 10: A reduced graph for FIG. 9 (intermediate step);

FIG. 11: A reduced graph for FIG. 9 (result);

FIG. 12: Sample streams with start and end time variables;

FIG. 13: A reduced graph for FIG. 12 (intermediate step);

FIG. 14: A reduced graph for FIG. 12 (result);

FIG. 1 shows how a frame is handled from its arrival at the ingress port, via the processing and queue, to the onward transmission thereof at the egress port. For this purpose, FIG. 1 shows the entire forwarding process. For the sake of simplicity, the forwarding process is divided into four phases, specifically routing, queue, transfer selection and transfer.

After the frame arrives at the ingress port, the switch evaluates the frame's Ethernet header. The switch selects the destination egress port based on the receiver address and the content of the forwarding database, which contains an assignment of destination MAC addresses to egress ports.

The switch provides one or more queues at the egress port, since the incoming data rate can be higher than the outgoing data rate of the egress port, as frames from a plurality of ingress ports can be sent via one egress port. The "Enhancements for scheduled traffic" [3] allow the implementation of up to eight queues in order to handle different types of data traffic separately. The switch assigns a frame to one of the queues by evaluating the priority code point (PCP) in the VLAN tag of the frame and carrying out a configurable assignment of PCP values to the hardware queues.

FIG. 2 shows the "transmission selection algorithm" (TSA), which is implemented for each queue. The TS polls the TSA of each queue in descending order to determine if a frame is available for transmission. Although IEEE Std 802.1Q specifies a plurality of TSAs, in this paper, the strict priority is modelled and other TSAs are considered to be out of scope.

The TSA with high priority advertises an available frame for transmission if the queue is not empty. As a result, the TS selects the frame at the front of the non-empty queue with the highest priority. However, this mechanism alone is not able to give hard real-time guarantees with regard to limited latency times or jitter. In the worst case, a frame with high priority is delayed by the transmission time of an MTU-sized best-effort frame that is currently in transmission.

Therefore, IEEE Std 802.1Q specifies an additional mechanism called "gating", which allows the processing of queues to be switched on or off for a certain period of time. This mechanism is implemented by placing a gate after each queue. When the gate of a queue is closed, the TS ignores the queue. This means that the egress port can be used by one queue or a plurality of queues on a dedicated basis. Gating thus makes the temporal separation of high-priority traffic and best effort traffic possible.

The opening and closing times of the gates are configured in the gate control list (GCL). The GCL is therefore the implementation of a time plan in which the queue obtains access to the medium. In order to meet the latency requirements of a stream, the GCLs of all switches passed through have to be calculated accordingly. The calculation of all GCLs in a network is therefore a global planning problem.

As presented in the system model, a directed graph is used to represent the network topology for routing purposes. For this purpose, two auxiliary relations are then defined, specifically in_edges and out_edges. These two relationships contain the incoming edges or outgoing edges for each node (see equation 2).

For the routing according to FIG. 3, a binary decision variable $x_{s,e}$ E{0,1} is introduced that, for each stream-edge combination in (s,e) ES×E indicates whether the stream s uses the edge e. If $x_{s,e}=1$, the edge e is said to be active for stream s. Otherwise the edge is said to be inactive.

In order to calculate the routes, five basic restrictions are used for each stream: First, the source node (src) only sends information (unidirectional communication) and it may therefore not have any active incoming edges (equation 3). Since $x_{s,e}$ cannot be negative, the restriction in equation 3 does not result in an active incoming edge.

Second, the source node has to have exactly one active outgoing edge since it is the beginning of the route.

Third, the destination node may not have any active outgoing edges since it is the end of the route.

Fourth, since the route must end on exactly one path at the destination node, the present model can only select one active incoming edge for the destination.

Finally, once the source and destination have been restricted, it has to be ensured that the route is connected via a single path through the network. Therefore, it is defined that, for each stream, all nodes that are neither source nor destination nodes have an equal number of active incoming edges and active outgoing edges:

As stated above, both routing loops and isolated loops can occur, as shown in FIG. 4. Routing loops are loops that are directly connected to the actual route, as shown on the left-hand side in the figure, while isolated loops, as shown on the right-hand side in the figure, are not part of the route.

In our model, as already described, the following conditions have to be ensured: First, only edges that have been selected in the routing part can be used. Second, the length of the allocation has to be sufficient to transmit the current. The transmission delay is used to calculate the required allocation.

FIG. 5 shows the transmission of a current for this purpose. Furthermore, the assignment to consecutive edges has to be consecutive, i.e., the transmission on the next edge has to begin immediately after the switch has finished processing the frame. Finally, a plurality of streams may not use an edge at the same time (TDMA).

As mentioned above, a restriction is defined to prevent a plurality of simultaneous allocations on the same edge by ensuring that the allocations are temporally separated, i.e., they do not overlap. FIG. 6 shows the two existing non-overlapping allocations for two streams on one edge, specifically stream s is assigned before stream s' (left-hand side of FIG. 6) or stream s' is allocated before stream s (right-hand side of FIG. 6).

The method of topology reduction is illustrated by way of example in FIG. 7. The original topology is shown on the left-hand side of FIG. 7, while the remaining figures show the results of the reduction for two source-destination combinations ($V_{src0} \rightarrow V_{dst0}$, top right and $V_{src1} \rightarrow V_{dst1}$, bottom right). In this example, the intersection between the edges of the two reduced topologies is empty and therefore no overlap between the assignments is possible.

However, the pre-processing results can be reused if streams are added or discarded, which are relevant use cases. In this case, the changes to the reduced topologies can be adopted step by step. Therefore, the initial costs are a good investment as they make it possible to quickly recalculate schedules and routes in the network.

FIG. 8 shows, by way of example, a topology of a possible network for use of the present method.

In order to further optimize the time plan and route synthesis, the network topology is shown as a graph G(V,E) having nodes V and edges E. As an extension of the previous concept, specialized reduced graphs for route and time plan synthesis are proposed. First, the graph reduction for the route synthesis of G to $G_R$ is presented, and then the reduction steps for the time plan synthesis are discussed.

A dedicated routing graph $G_{R,s}$ is obtained for each stream S by reducing the graph. As a basis for the reduction, a certain number of routes are calculated for each stream. The method described is independent of the number of routes. The amount of the considered route of the stream 0 is described as $R_s$. A single route is represented as a sequence of the visited nodes, e.g. route 0 for stream s:$V_{r0,s} \subseteq V$. Furthermore, the amount of all the nodes contained in at least one route of the stream S is denoted as $R_s. \subseteq V_{r0,s}$. $G_{R,s}$ is generated, in which all nodes are excluded that do not occur in any route of the stream $$\forall\, v \in G_{R,s} : v \in \mathcal{V} \setminus (\mathcal{V} \setminus \mathcal{V}_{R,s}).$$

The procedure is described below with reference to an example. FIG. 9 shows the original graph including a selection of routing options for a stream. The starting node of is marked in white and the destination node is marked in black. The routing options shown result in a total of eight possible routes (two combinations for each ring passed through).

The reduced graph in FIG. 10 then results from the routing options given in FIG. 9.

This graph is further reduced by converting sequences of nodes having the same node degree deg(v) into an edge in each case. The node degree in this case denotes the number of edges of a node. A node is inserted in each case at the points where the node degree changes. This then results in the final routing graph for stream. The result is shown in FIG. 11.

Based on the final routing graph, the ILP model can be greatly reduced because a decision variable (originally xse) is now not required for each possible edge in the original graph, but only for each edge in the reduced graph.

Two factors significantly influence the size of the ILP model in the time plan synthesis:

1. The number of edges to which the stream has to be allocated. For each potential edge of a stream, a variable is added to the model for the start and end time of the transmission.
2. The number of edges on which there is a potential conflict between two streams. A conflict consists in two streams sharing the same edge in the same direction. In this case, it has to be ensured that the streams are not allocated to the same edge at the same time.

FIG. 12 shows the potential edges of two streams for each of which a start ($start_{s,e}$) and end time variable ($end_{s,e}$) are added. Since a "no-wait schedule" is being calculated, the start time on the first edge is the only degree of freedom with regard to time planning. Based on this knowledge, all further start and end times can be calculated depending on the start on the first edge. Accordingly, the number of variables can be significantly reduced.

In order to prevent conflicts, two conditions are set in the original model that prevent two streams (,) from using one edge at the same time. These conditions ensure that either stream is processed before stream or is processed before. In the original model, the number of conditions is already optimized in that a potential conflict between two streams on an edge is only considered possible if the two streams have at least one route that uses this edge. FIG. 13 shows the result of this optimization. Only the edges that are used by the two streams in the same direction remain.

In this case, it is apparent that the edges on which a conflict can occur form sequences of a plurality of consecutive edges. Due to the "no-wait" property of the time plan, streams cannot overtake one another once the order has been set on an edge. That means that, in the case of consecutive edges, $s_1$ cannot be scheduled in front of $s_0$, and, on the next edge in the sequence, $s_0$ is in front of $s_1$. As a result, sequences of consecutive edges can be considered a conflict domain and the decision as to which stream is scheduled first has to be made only once for each conflict domain. FIG. 14 shows the resulting situation.

Until now, potential conflicts have only been considered due to edge use. If the temporal profile of the streams is considered, it is possible to optimize the model even further. A certain period of time elapses for each edge and intermediate node that a stream passes. Based on this time span, it is possible to calculate when a stream can arrive at an edge at the earliest. For each stream, it is also known at what time the stream has to arrive at its destination at the latest. From this it is possible to derive when a stream has to pass an edge at the latest. There is therefore a specific time window for each stream on each edge. This knowledge can be used in two respects: 1. Collisions between two streams only need to be considered if the time windows overlap on an edge used by the two streams. 2. The time window can be used to restrict the solution space by limiting the definition range of the start time variable of the streams accordingly. For this purpose, the definition range of the variables $start_{s,e}$ and $end_{s,e}$ is restricted accordingly.

In summary, it can be said that the present optimized model generally clearly surpasses the base model in non-trivial scenarios. The pre-processing time increases in the case of more complex topology, but the total runtime is still reduced by up to a factor of 100. In addition, the reduced pre-processing topologies can be reused for incremental changes to the network, which makes cost-effective reconfiguration of the network possible.

The invention claimed is:

1. A method of routing and scheduling in a network consisting of a plurality of network nodes and having an actual topology, the method comprising the steps of sequentially:

in a reduction phase, reducing the number of possible links to the network nodes is first reduced by not limiting the space of the possible solutions for routing while removing only links or network nodes that do not belong to the solution space;

calculating a reduced topology from the reduced number of links; and in a routing and time planning phase, calculating an optimization of the routing and scheduling in the reduced topology, with further restriction of the solution space by not having two streams overlapping in a time window, wherein the time window is defined as a time between a stream's arrival at an edge at the earliest and a time the stream has to arrive at its destination at the latest.

2. The method according to claim 1, wherein the reduced topology has fewer network nodes than the actual topology prior to reduction.

3. The method according to claim 1, wherein, in the reduction phase, a separate topology is introduced for each combination of source and destination, and a route from a source to a destination or network node is calculated for each topology.

4. The method according to claim 3, further comprising the step of:

discarding all links that are not part of the calculated route.

5. The method according to claim 1, wherein the routes are calculated using integer linear programming.

6. The method according to claim 1, wherein, in order to calculate the optimized route, all transmission times of the possible routes are calculated and a time-optimized route is then selected.

7. The method according to claim 1, wherein, in order to calculate the optimized route, all distances of the possible routes are calculated and a distance-optimized route is then selected.

8. The method according to claim 1, further comprising the step of:

taking into account the occupancy rate of the links used in the reduction phase.

9. The method according to claim 1, further comprising the step of:

taking into account the collision probability of the links used in the reduction phase.

10. The method according to claim 1, wherein the method is carried out by a network subscriber at a network node.

11. The method according to any of claim 1, wherein the method is used on Ethernet-based networks.

12. A network comprising a plurality of network subscribers and having a plurality of network nodes and an actual topology, wherein the method of routing a network according to claim 1 is carried out for routing between two network subscribers.

13. The network according to claim 12, wherein the network is a TDMA-based network or a CAN bus or SERCOS III or a Profibus or EtherCat.

* * * * *